United States Patent
Fahs et al.

(10) Patent No.: US 8,751,771 B2
(45) Date of Patent: Jun. 10, 2014

(54) EFFICIENT IMPLEMENTATION OF ARRAYS OF STRUCTURES ON SIMT AND SIMD ARCHITECTURES

(75) Inventors: Brian Fahs, Los Altos, CA (US); John R. Nickolls, Los Altos, CA (US); Kathleen Elliott Nickolls, legal representative, Los Altos, CA (US); Henry Packard Moreton, Woodside, CA (US); Brett W. Coon, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 429 days.

(21) Appl. No.: 13/247,855

(22) Filed: Sep. 28, 2011

(65) Prior Publication Data

US 2012/0089792 A1    Apr. 12, 2012

Related U.S. Application Data

(60) Provisional application No. 61/387,944, filed on Sep. 29, 2010.

(51) Int. Cl.
| | |
|---|---|
| G06F 12/00 | (2006.01) |
| G06F 13/00 | (2006.01) |
| G06F 13/28 | (2006.01) |
| G06F 9/26 | (2006.01) |
| G06F 9/34 | (2006.01) |
| G06F 9/38 | (2006.01) |
| G06F 9/30 | (2006.01) |

(52) U.S. Cl.
CPC .......... *G06F 9/3885* (2013.01); *G06F 9/3851* (2013.01); *G06F 9/30036* (2013.01)
USPC ........................................ 711/220; 711/154

(58) Field of Classification Search
CPC .. G06F 9/30036; G06F 9/3851; G06F 9/3885
USPC .................................................. 711/154, 220
See application file for complete search history.

(56) References Cited

U.S. PATENT DOCUMENTS

| | | | |
|---|---|---|---|
| 7,877,573 B1 * | 1/2011 | Le Grand | 712/7 |
| 8,112,614 B2 * | 2/2012 | Nickolls et al. | 712/22 |
| 8,255,665 B2 * | 8/2012 | Selvaggi et al. | 711/203 |
| 2008/0140994 A1 * | 6/2008 | Khailany et al. | 712/205 |
| 2009/0125702 A1 * | 5/2009 | Selvaggi et al. | 712/22 |

* cited by examiner

*Primary Examiner* — Ryan Bertram
(74) *Attorney, Agent, or Firm* — Patterson & Sheridan, LLP

(57) ABSTRACT

One embodiment of the present invention sets forth a technique providing an optimized way to allocate and access memory across a plurality of thread/data lanes. Specifically, the device driver receives an instruction targeted to a memory set up as an array of structures of arrays. The device driver computes an address within the memory using information about the number of thread/data lanes and parameters from the instruction itself. The result is a memory allocation and access approach where the device driver properly computes the target address in the memory. Advantageously, processing efficiency is improved where memory in a parallel processing subsystem is internally stored and accessed as an array of structures of arrays, proportional to the SIMT/SIMD group width (the number of threads or lanes per execution group).

20 Claims, 9 Drawing Sheets

EFFICIENT IMPLEMENTATION OF ARRAYS OF STRUCTURES ON SIMT AND SIMD ARCHITECTURES

CROSS-REFERENCE TO RELATED APPLICATIONS

This application claims the priority benefit of provisional U.S. Patent Application Ser. No. 61/387,944, filed Sep. 29, 2010, the subject matter of which is hereby incorporated by reference.

BACKGROUND OF THE INVENTION

1. Field of the Invention

The present invention generally relates to computer architectures and, more specifically, to efficiently implementing arrays of structures on SIMT and SIMD architectures.

2. Description of the Related Art

A class of parallel processing subsystems (PPSs) such as single-instruction multiple-thread (SIMT) or single-instruction multiple-data (SIMD) processors execute each instruction on a group of parallel threads or parallel data lanes. Such parallel processors benefit because the same instructions are performed on various data sets in a highly parallel manner. Alternatively, parallel execution of a large number of generally synchronized threads is performed, using a common instruction unit where different threads may follow divergent execution paths through a given thread program.

Traditionally, data sets for SIMT and SIMD processors are stored using a C-style construct called an array of structures (AoS). In an array of structures, the various fields within a first structure are sequentially stored. The second structure immediately follows the first structure, the third structure follows the second structure, and so on. With this storage pattern, the threads operating within the PPS efficiently access adjacent fields from a particular structure because they are located in sequential locations in memory. However, where threads access the same field in sequential structures for various operations, an array of structures results in a sparse memory access pattern where addresses accessed by each thread are separated from neighboring lanes by a distance equal to the size of a structure. Such accesses are generally much less efficient than memory accesses that are sequential for adjacent SIMT thread and SIMD data lanes. The inefficiency arises because the addresses accessed by parallel threads or data lanes are spread apart with a stride length equal to the size of each structure within the array of structures.

Alternatively, the data sets may be organized as a structure of arrays (SoA). In such an organization, the first fields of each structure are allocated adjacent storage locations in memory. The second fields are then allocated sequential locations and so on until all fields of all structures are allocated a storage location. The threads operating within the PPS efficiently access specific fields from adjacent structures, as they are located sequentially in memory. However with this approach, accesses to adjacent fields in a particular structure are separated by a distance proportional to the number of structures. This distance can be significant in the case of large data sets. Therefore, accesses to fields across a given structure result in a sparse memory access pattern reducing efficiency.

One solution to this problem is for programmers to write program source that allocates fields within a particular structure and particular fields in adjacent structures for more efficient access. Programmers may use a hybrid between AoS and SoA using the number of available thread/data lanes to optimize access to adjacent fields in a structure and to a particular field in adjacent structures. However, this programming approach has certain drawbacks. First, the programmer typically knows and utilizes the architectural details of the PPS in order to choose a memory allocation approach that is optimized for the particular PPS. Second, a PPS on one system may have different architectural details than the PPS on another system. Program source code optimized for the PPS architecture on one system may not run efficiently on another system with a different PPS architecture. Third, PPS architectures may change over time. Program source code optimized for a current PPS architecture may not run efficiently on a future version of that PPS with different architectural details.

As the forgoing illustrates, what is needed in the art is a more optimized way to store data being accessed by parallel processing subsystems.

SUMMARY OF THE INVENTION

One embodiment of the present invention sets forth a method for storing and retrieving data associated with a parallel processing subsystem. A system is configured to receive a memory access instruction directed to a memory of the parallel processing subsystem. A base address corresponding to a first memory location of the memory within the parallel processing subsystem is received along with the instruction. The system computes an offset proportional to the number of thread/data lanes within the parallel processing subsystem. The offset is added to the base address to determine the location where the data is to be stored or retrieved. The system then completes the memory access instruction at the memory location corresponding to the base address plus the offset.

One advantage of the disclosed method is that processing efficiency is improved where memory in a parallel processing subsystem is internally stored and accessed as a series of groups of structures (array of structures of arrays), where the group size is proportional to the SIMT/SIMD group width (the number of threads or lanes per execution groups).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
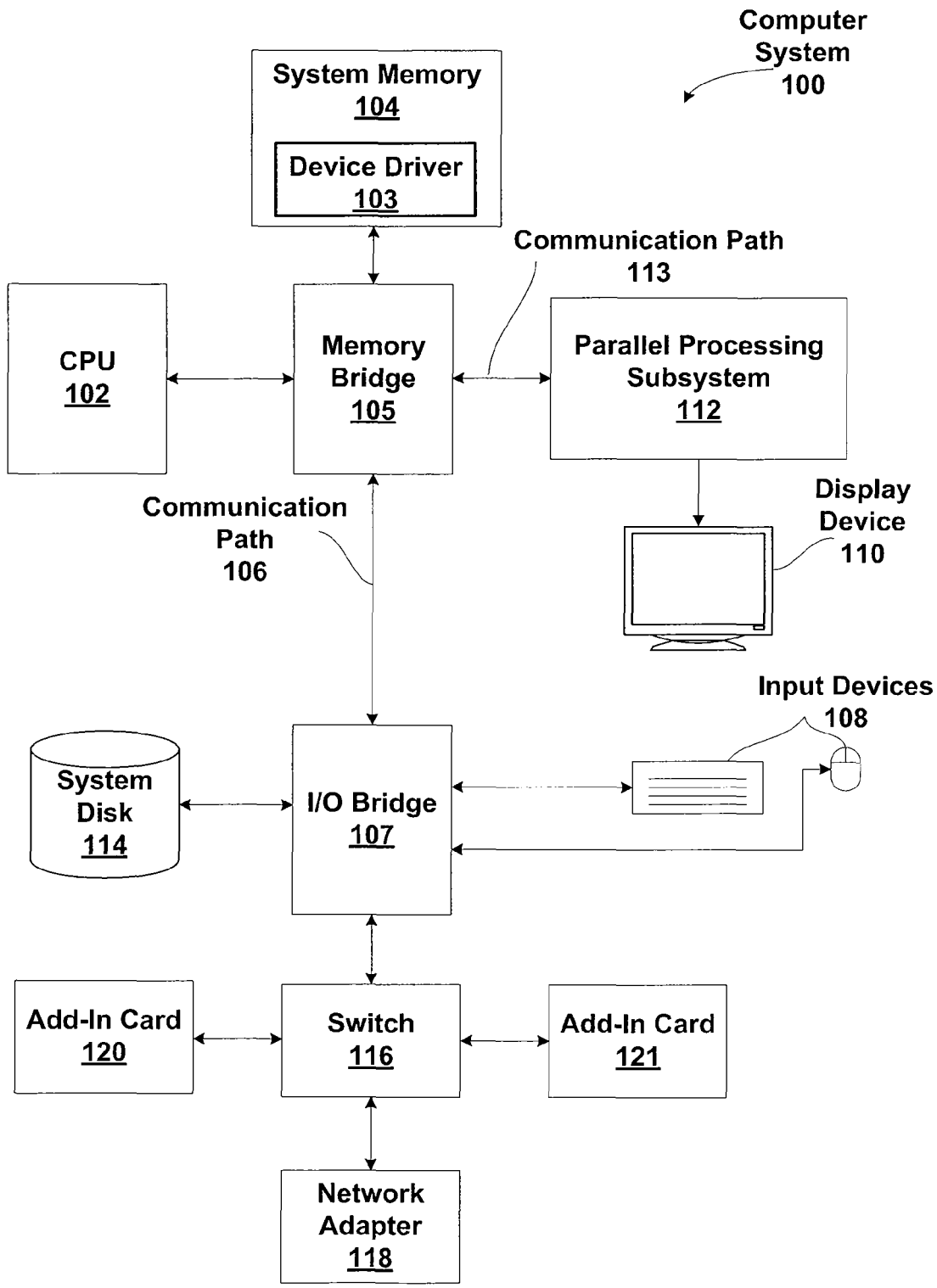
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
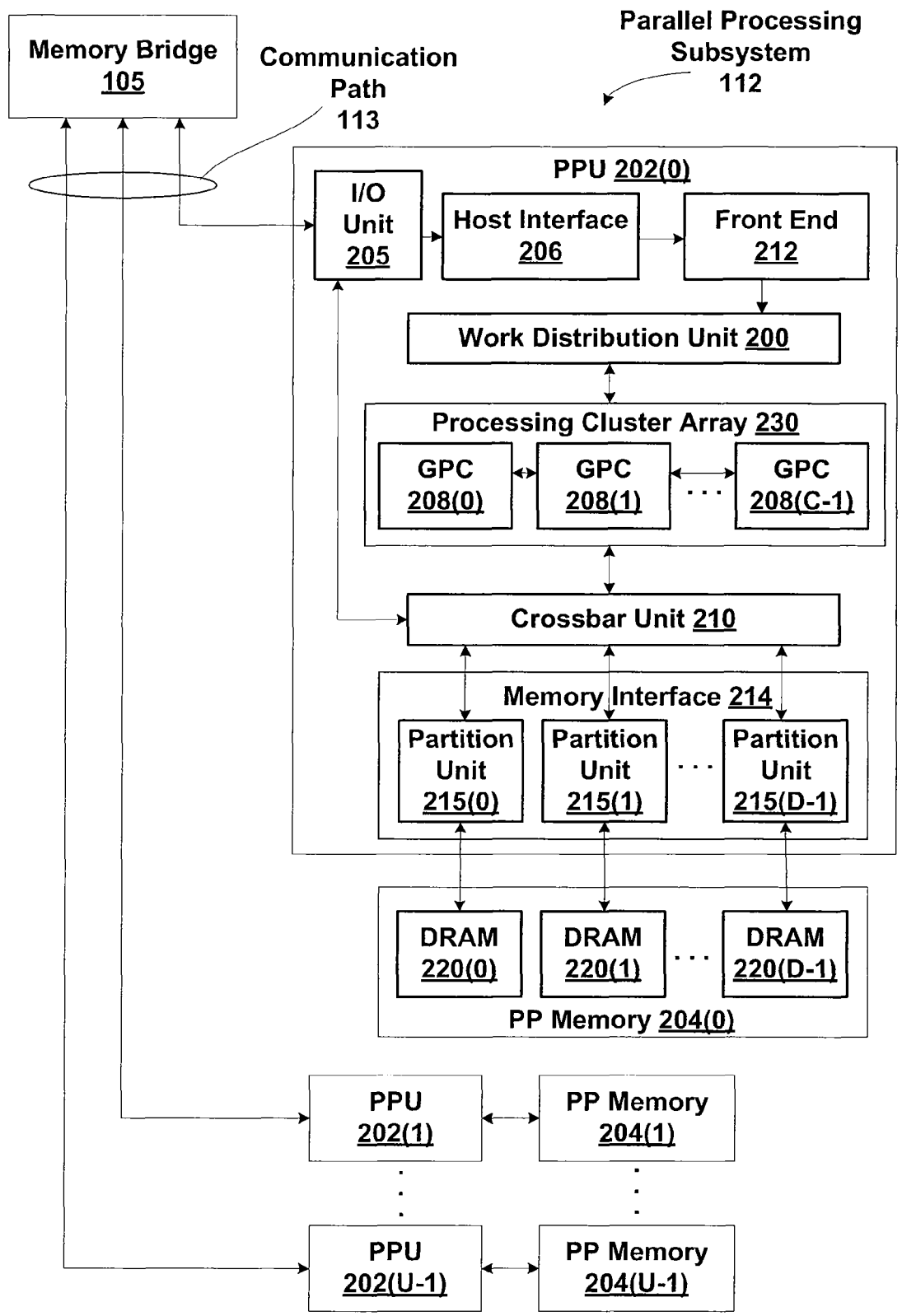
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
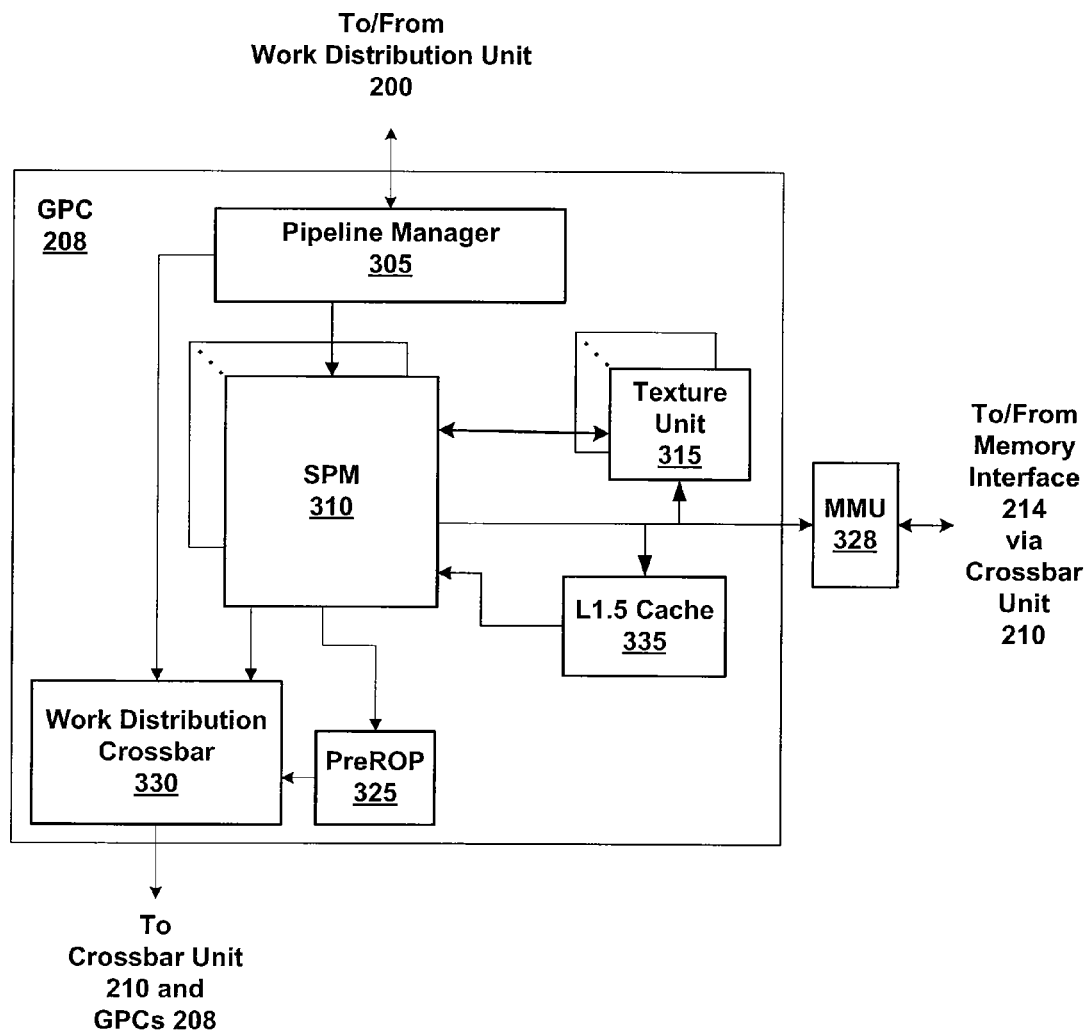
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines are idle during cycles when that thread group is being processed. A thread group may also include more threads than the number of processing engines within the SPM 310, in which case processing takes place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether or not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
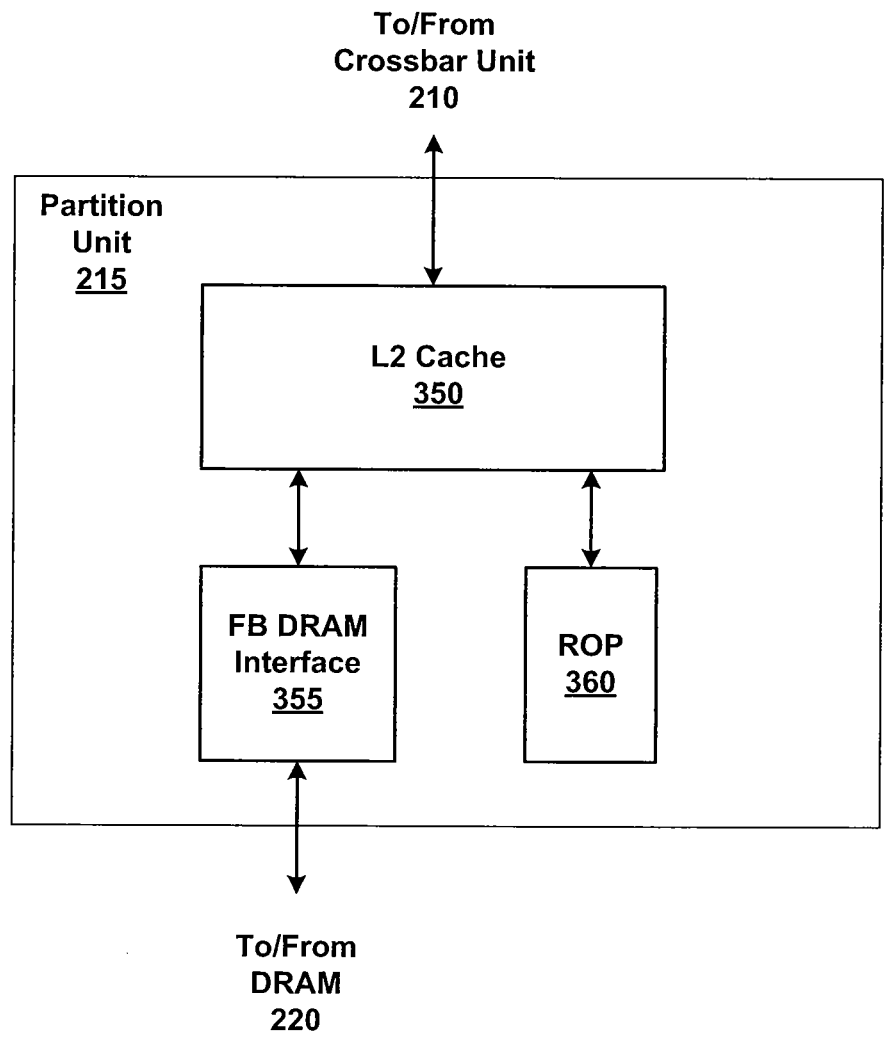
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
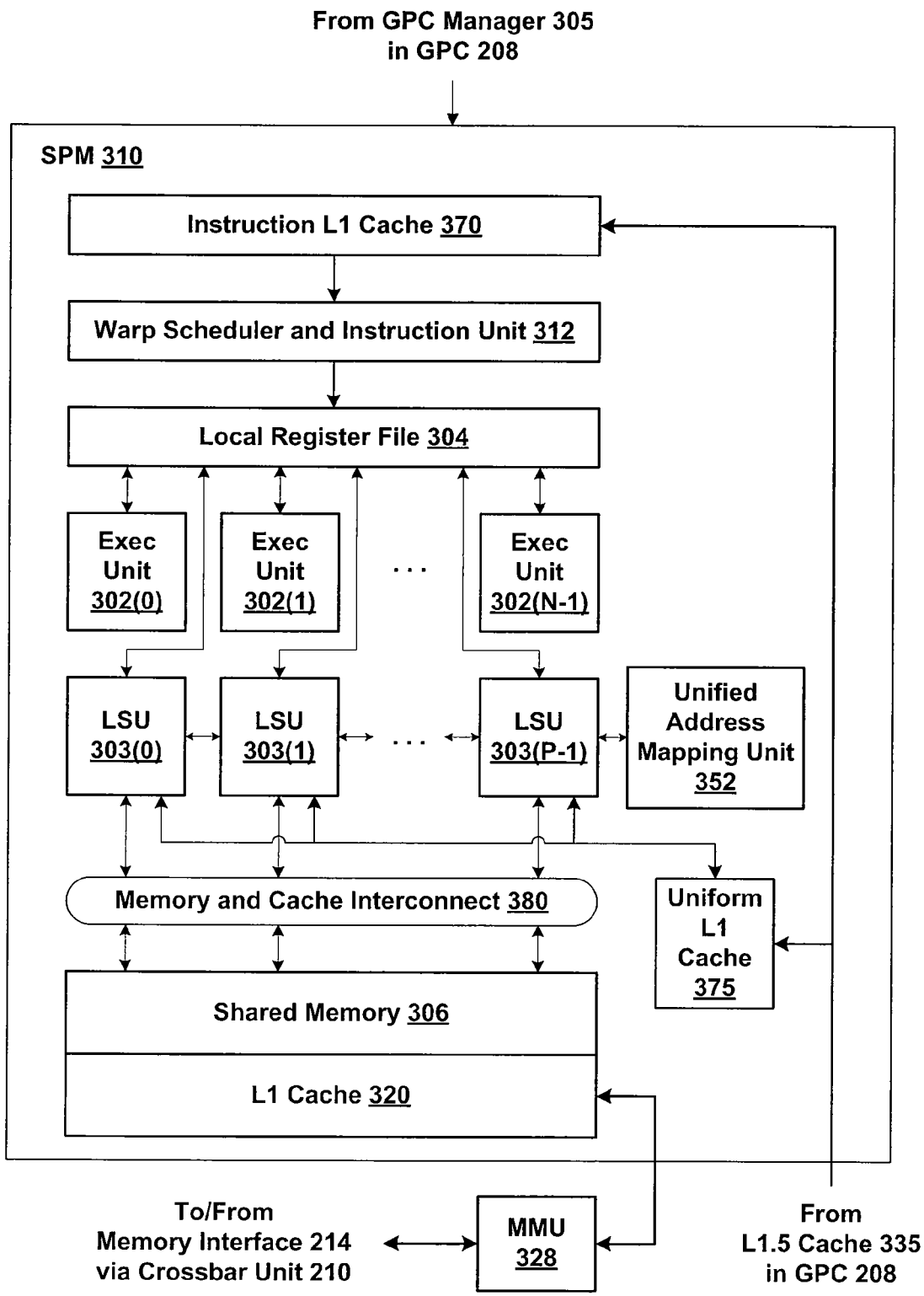
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 cache 335.

Array of Structures of Arrays Overview

Figure 4A:
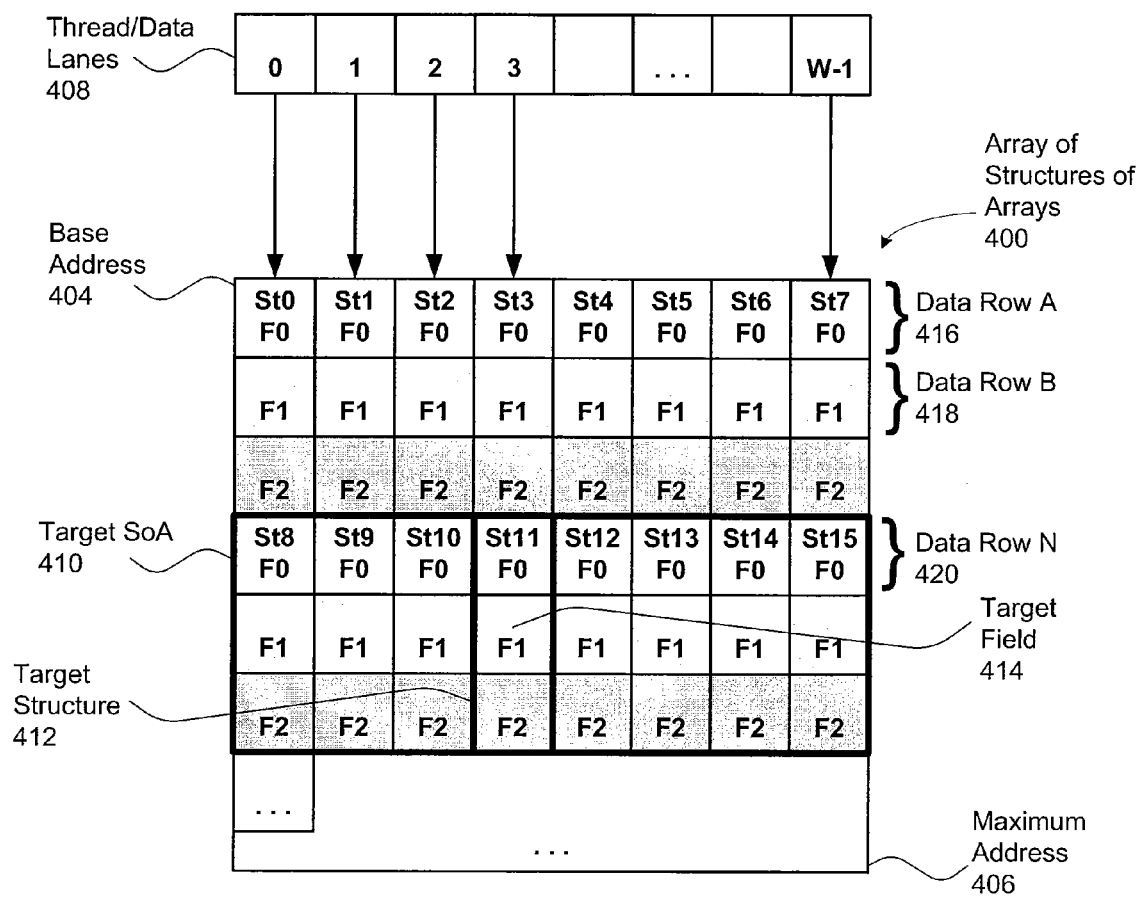
FIG. 4A illustrates an array of structures of arrays (AoSoA) within a DRAM of a PP Memory of FIG. 2, according to one embodiment of the invention.

FIG. 4A illustrates an array of structures of arrays (AoSoA) 400 within the DRAM 220 of the PP Memory 204 of FIG. 2, according to one embodiment of the invention. As shown, threads access the AoSoA 400 via a number 'W' of thread/data lanes 408 numbered from 0 to W−1. As previously discussed above with respect to FIGS. 3A-3C, the hardware execution channels within an SPM 310 may be conceptually divided into thread/data lanes, such as the thread/data lanes 408, and the threads of a thread group executing within the SPM 310 may be thought of as executing across those thread/data lanes. The AoSoA 400 may be configured for simultaneous access by the threads executing within thread/data lanes 408 using SIMT or SIMD instruction issue techniques. As described in greater detail herein, the structure of the AoSoA 400 enables the threads executing within the thread/data lane 408 to access memory locations with the DRAM 220 at a unit stride length proportional to the number of thread/data lanes 408. Consequently, memory access efficiency is increased relative to memory accesses implemented using conventional data structures such as those shown in FIGS. 4B and 4C below.

The AoSoA 400 is a data structure within the DRAM 220 and has a base address 404 corresponding to the first accessible location in the DRAM 220 and a maximum address 406 corresponding to the last accessible location in the DRAM 220. The AoSoA 400 is divided into rows and columns. Each column of the AoSoA 400 is associated with a different thread/data lane 408, and each row of the AoSoA is associated with a different data element. As would be apparent to persons skilled in the art, the threads executing across the thread/data lanes 408 are able to access memory more efficiently when a full data row of the AoSoA 400 is transferred as a block transfer, and each thread accesses a different column of the data row. In such cases, each thread accesses a data element for the current operation and no thread idles.

To ensure all threads have simultaneous access to data elements, the following process is used to allocate space for a target structure of arrays (SoA) 410 within the AoSoA 400. The first row of the target SoA 410 is allocated to the first element of each of the first 'W' structures. The second row of the target SoA 410 is allocated to the second element of each of the first 'W' structures. This process continues until all fields of the first 'W' structures are allocated to a contiguous set of rows within the target SoA 410. Space is then allocated for a second target SoA within the AoSoA 400. The first row of the second target SoA is allocated to the first element of the next set of 'W' structures, followed by a row containing the second element of the next set of 'W' structures. This process continues until either all fields of all structures are allocated a location in memory or the maximum address 406 is reached.

The following example illustrates how the columns and rows are set up in an exemplary AoSoA 400 where each structure has three elements labeled F0, F1, and F2 to be allocated among eight thread/data lanes 408. As used here, "structure" refers to a simple array consisting of a collection of elements (such as values or variables) each identified by at least one index. The first elements F0 of the first eight structures are sequentially allocated a location in data row A 416. The second elements F1 of the first eight structures are then sequentially allocated a location in data row B 416. This process continues (here, ending with the third elements F2), until all fields of the first eight structures are allocated a location in the target SoA 410 within the AoSoA 400. The F0 fields of the second group of eight structures are then allocated a location at data row N 420. The F1 fields of the second set of eight structures are then sequentially allocated a location in the next data row. This process continues until either all fields of all structures are allocated a location in memory or the maximum address 406 is reached.

To set up this exemplary AoSoA 400, the following declaration set forth in Table 1 may be used:

TABLE 1

```
#define AoSoA_SIZE ((ARRAY_SIZE/SIMT_WIDTH) +
   (ARRAY_SIZE%SIMT_WIDTH ? 1 : 0))
struct Foo_AoSoA_t {
   int       field0[SIMT_WIDTH];
   float     field1[SIMT_WIDTH];
   some_type field2[SIMT_WIDTH];
} foo_AoSoA[AoSoA_SIZE];
```

In this particular declaration, each structure within the AoSoA 400 has three fields: field 0 (F0) of type int, field 1 (F1) of type float, and field 2 (F2) of type some_type. In one embodiment, each thread accesses a different memory location in data row A 416 to perform an operation on the F0 field from a sequential number of data structures proportional to the number of thread/data lanes 408. SIMT_WIDTH in the declaration of Table 1 represents the number of thread/data lanes 408. In the AoSoA 400, SIMT_WIDTH is eight because there are eight thread/data lanes 408. However, SIMT_WIDTH is dependent on the specific architecture of SPM 310.

To access data stored within the AoSoA 400, the device driver 103 is configured to perform address calculations in a manner opaque to the programmer. If a thread accesses sequential fields in a given structure within the AoSoA 400, then the device driver 103 computes the addresses such that these accesses occur within the same column of the AoSoA 400. Thus, if a thread accesses a particular field of a structure in data row A 416, then the thread accesses the adjacent field of the same structure at a location in the same column at data row B 418. Likewise, if a thread accesses a specific field in successive SoAs within the AoSoA 400, then the device driver 103 computes the addresses such that these accesses occur within the same column of the AoSoA 400. Thus, if a thread accesses a particular field of a structure in data row A 416, then the thread accesses the same field of the next set of structures at a location in the same column at data row N 420. Thus, threads efficiently access memory within their column of memory.

The following illustrates an exemplary AoSoA 400 where threads executing across eight thread/data lanes 408 are configured to access data fields within structures each having three elements labeled F0, F1, and F2. A thread accessing the F0 field of a particular structure at data row A 416 may access the F1 field of the same structure in the same column of the AoSoA 400 and exactly one row below at data row B 418. A thread accessing the F0 field of a particular structure at data row A 416 may access the F0 field in the next group of structures in the same column of the AoSoA 400 and exactly three rows below at data row N 420. In either case, the device driver 103 performs calculations such that the threads access memory in the same column of the AoSoA 400.

To access a specific target field 414 associated with a target SoA 410 in this exemplary AoSoA 400 the following address calculation steps set forth in Table 2 may be implemented by the device driver 103 of FIG. 1:

TABLE 2

```
void*
compute_AoSoA_addr(void* AoSoA_base,
int struct_idx, int field_offset, int struct_sz)
{
  return (AoSoA_base +
    (floor(struct_idx/SIMT_WIDTH) * SIMT_WIDTH*struct_sz) +
    (struct_idx%SIMT_WIDTH * sizeof(int) +
    SIMT_WIDTH*field_offset);
```

The device driver 103 typically receives various parameters from the instruction including the base address 404 of the AoSoA 400 (AoSoA_base), an index value indicating which structure is to be accessed (struct_idx), an offset indicating which field is to be accessed (field_offset), and a value representing the size in memory of each structure (struct_sz). The device driver 103 first computes the base address 404 of the AoSoA 400 using AoSoA_base, as shown in Table 2 as the first line of the return command. The device driver 103 computes a first partial offset proportional to the starting address of the target SoA 410, as shown in the second line of the return command. This is typically an integer number of rows from the base address 404. In the exemplary AoSoA 400, the target SoA 410 is the second SoA and each structure has three fields, therefore the target SoA is three rows down from the base address 404. To this first partial offset, the device driver 103 adds a second partial offset representing the location of the target structure 412 within the target SoA 410, as shown in the third line of the return command. This is typically an integer number of structures after the target SoA 410 address. In the exemplary AoSoA 400, the target structure 412 is the fourth structure in the target SoA 410, therefore the target SoA is in the fourth column of the AoSoA 400. To this second partial offset, the device driver 103 adds a a third partial offset representing the location of the target field 414 within the target structure 412, as shown in the fourth line of the return command. This is typically an integer number of rows relative to the address of the target structure 412. In the exemplary AoSoA 400, the target field 414 is the second field of the target structure 412, therefore the target field 414 is in the second row relative to the target structure 412. The device driver 103 then completes the memory access at the memory location of the target field 414 as determined by the sum of the base address and the computed partial offsets. The device driver 103 calculations to determine the memory location of the target field 414 are performed in a manner that is opaque to the programmer.

The structure of the AoSoA 400 provides certain levels of flexibility for the programmer that are advantageous. For example, if SIMT_WIDTH is a power of 2, as is commonly the case, then the modulo ('%') operations may be performed using simple Boolean operations, and the division ('/') and multiplication ('*') operations may be performed using bit shifts. Another example is aligning the SoAs within the AoSoA 400 on boundaries consistent with the memory access byte granularity of the particular architecture. FIG. 4A and the code segments of Tables 1 and 2 indicate interleave groups of structures on a granularity equal to sizeof(int). For example, in a system where sizeof(int) is four bytes, FIG. 4A and the code segments of Tables 1 and 2 indicate a four-byte granularity. Other granularities are possible, and interleave granularity would typically be chosen to match the memory access byte granularity most efficiently accessible by the threads. For example, the memory access byte granularity may be four bytes while the size in memory of a field in the SoA within the AoSoA 400 is one byte. In such a case, the field in the SoA within the AoSoA 400 may be advantageously padded by three additional bytes so each field in the SoA within the AoSoA 400 is placed on a four-byte boundary. Thus, when the size in memory of each structure within the AoSoA 400 is not a multiple of the smallest efficiently accessible memory access byte granularity, the structure size may be padded with unused bytes resulting in a more efficient access pattern. Alternatively, fields within the structures may remain packed such that each field in each structure has specific alignment boundaries. In some cases, this may reduce the amount of memory required by the AoSoA 400.

It will be appreciated that the architecture described herein is illustrative only and that variations and modifications are possible. For example, threads executing across any number of thread/data lanes 408 may be configured to access the AoSoA 400. In another example, any number of structures of arrays may be present within the AoSoA 400. In another example, each structure within the AoSoA 400 may be of any size in memory and may include any number of fields. In another example, the fields within each structure may be of any combination of data types. Further, although C-style code is presented to illustrate various concepts, one skilled in the art would recognize that any suitable programming language may be used to implement the present disclosure.

Figure 4B:
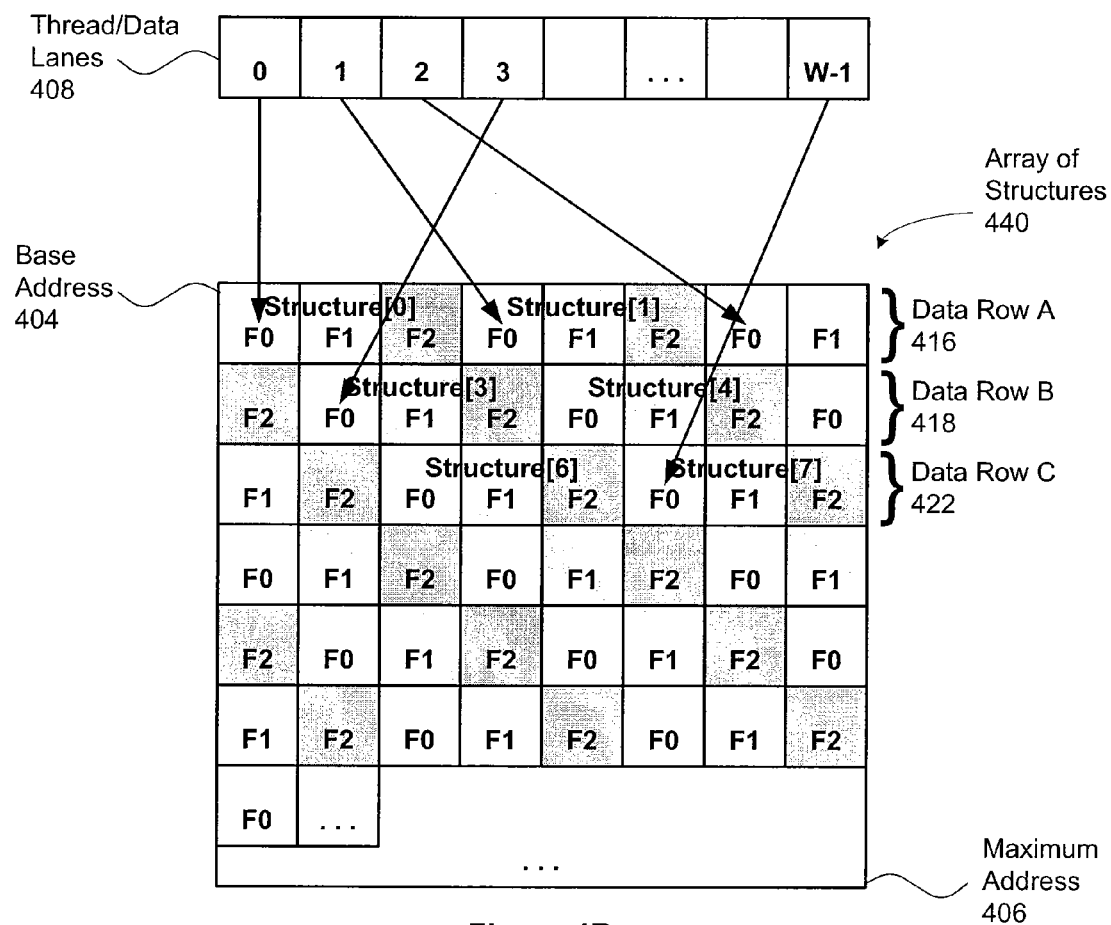
FIG. 4B illustrates an array of structures (AoS) utilizing a conventional approach.

In contrast to AoSoA 400, conventional data structures do not provide the programming flexibility or enable the memory access efficiencies enabled by the AoSoA 400. As previously described herein, one such conventional data structure is an array of structures (AoS) 440, as illustrated in FIG. 4B. With this structure, adjacent fields in the first structure are located at sequential positions in the AoS 440 starting at the base address 404. The fields of the second structure are then allocated and so on until all fields of all structures are allocated a position in the AoS 440 or the maximum address 406 is reached. In an exemplary AoS 440, the thread/data lanes 408 perform an operation on the F0 fields of all data structures. The threads access respective F0 fields at a stride length equal to the size of each structure, which is not necessarily a unit stride length proportional to the number of thread/data lanes 408. As a result, threads executing across the first three thread/data lanes 408 may access the first F0 parameter on data row A 416 of the exemplary AoS 440. Threads executing across the next three thread/data lanes 408 may access the F0 parameter on data row B 418. Threads executing across the last two thread/data lanes 408 may access the F0 parameter on data row C 422. As the forgoing amply illustrates, the threads executing on the SPM 310 access the AoS 440 in an inefficient manner with a resulting decrease in efficiency and performance.

Figure 4C:
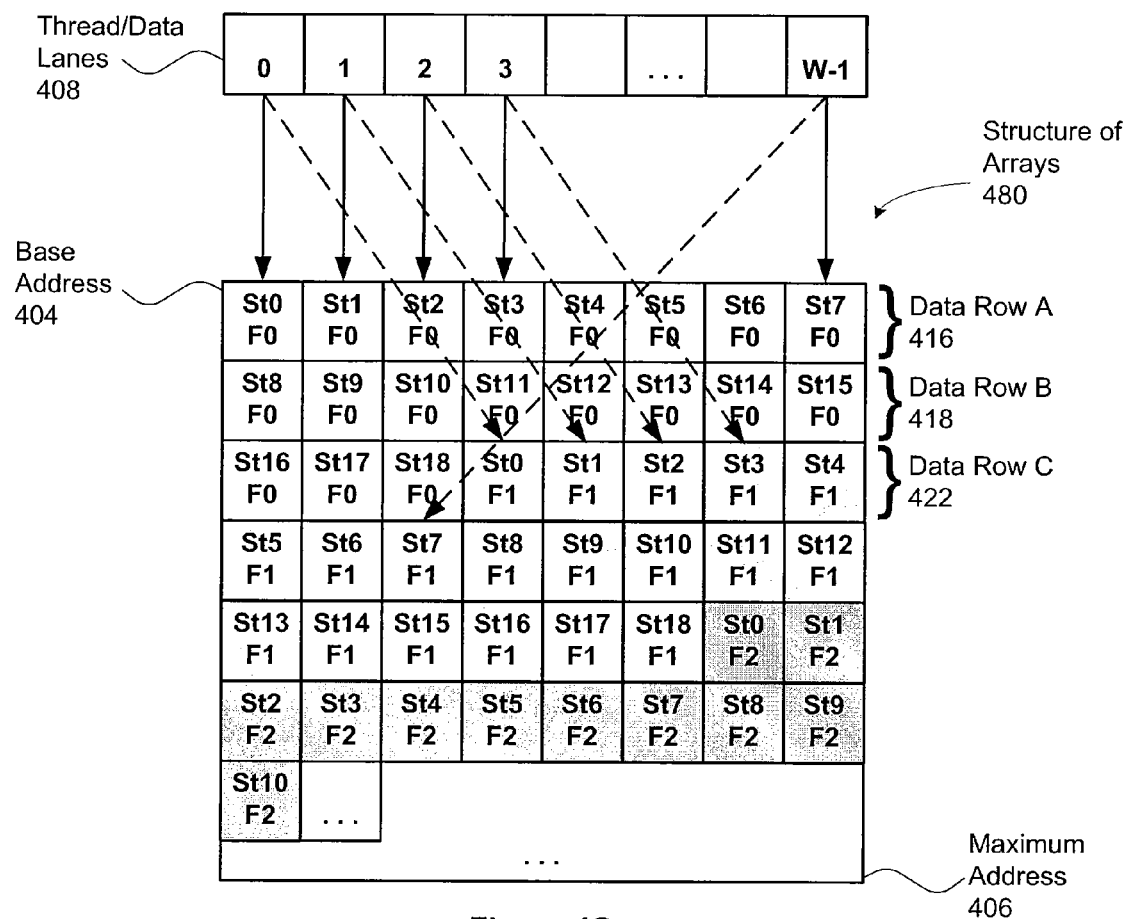
FIG. 4C illustrates a structure of arrays (SoA) utilizing a conventional approach.

As also previously described herein, another such conventional data structure is a structure of arrays (SoA) 480, as illustrated in FIG. 4C. With this structure, the first fields of adjacent structures are allocated sequential positions in the SoA 480 starting at the base address 404. The fields of the second structure are then allocated and so on until all fields of all structures are allocated a position in the SoA 480 or the maximum address 406 is reached. In an exemplary SoA 480, the thread/data lanes 408 perform an operation on the F0 fields of all data structures. The threads efficiently access respective F0 fields to perform the operation via a single access to a block of memory locations at data row A 416 of the exemplary SoA 480. Where the next operation requires another set of F0 fields, the threads may efficiently access the fields via a single access to a block of memory locations at data row B 418. However, where the next operation requires a set of F1 fields, the threads access the fields at a distance which is not a unit stride of memory in the SoA 480. In an SoA 480 with a large number of structures, the set of F1 fields may be located at a very large distance from the corresponding F0 fields. Striding by such a large distance may invoke additional memory accesses via the MMU 328, which are typically much slower and will reduce efficiency. Again, as the forgoing amply shows, the threads executing on the SPM 310 access the SoA 480 in an inefficient manner with a resulting decrease in efficiency and performance.

Figure 5:
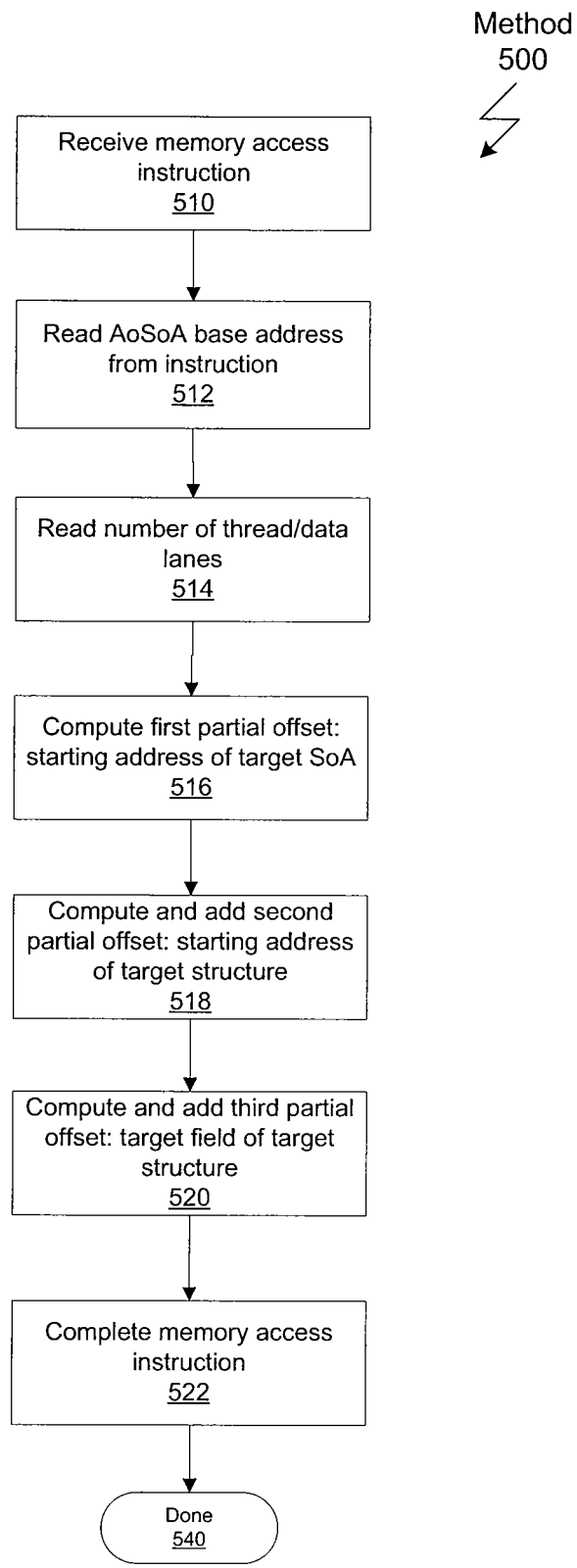
FIG. 5 is a flow diagram of method steps for accessing data associated with a target structure of arrays (SoA) within an array of structures of arrays (AoSoA), according to one embodiment of the invention.

FIG. 5 is a flow diagram of method steps 500 for accessing data associated with a target structure of arrays (SoA) 410 within an array of structures of arrays (AoSoA) 400, according to one embodiment of the invention. Although the method steps are described in conjunction with the systems of FIGS. 1-3C, persons skilled in the art will understand that any system configured to perform the method steps, in any order, is within the scope of the present invention.

The method begins in step 510, where the device driver 103 of FIG. 1 receives a memory access instruction associated with a target field 414 within a target SoA 410 of the AoSoA 400. In step 512, the device driver 103 reads the base address 404 of the AoSoA 400 via a parameter passed by the instruction. In step 514, the device driver 103 reads a value corresponding to the number of thread/data lanes 408. The number of thread/data lanes 408 is used by the device driver 103 to properly set up and access the rows and columns of the target SoA 410 within the AoSoA 400. In step 516, the device driver 103 computes a first partial offset corresponding to the position of the target structure of arrays (SoA) 410 relative to the base address 404, which is an integer number of rows from the base address 404. In step 518, the device driver 103 computes and adds a second partial offset to this first partial offset corresponding to the starting address of the target structure 412, which is an integer number of structures from the starting address of the target SoA 410. In step 520, the device driver 103 computes and adds a third partial offset to this second partial offset corresponding to the address of the target field 414, which is an integer number of rows from the starting address of the target structure 412. In step 522, the device driver 103 completes the memory access instruction to the target field 414 within a target SoA 410 of the AoSoA 400. The method terminates at step 540.

In sum, the disclosed technique provides an optimized way to allocate and access memory in a parallel processing subsystem. Specifically, the device driver 103 sets up an array of structures of arrays (AoSoA) 400 for access by threads executing across a number of thread/data lanes 408 using SIMT or SIMD instruction issue techniques. Once the AoSoA 400 is set up, the device driver 103 receives instructions that target memory locations within the AoSoA 400. The device driver 103 calculates the final address within the AoSoA based on the number of thread/data lanes 408. The device driver also receives information from the instruction such as the base address 404 of the AoSoA 400, the structure index, the field offset, and the structure size. The device driver utilizes these parameters to compute the address of the target field 414 within the AoSoA 400. The result is a memory allocation and access approach where the device driver properly computes the memory address of the target field 414 in the AoSoA 400.

Advantageously, successive fields within a structure are efficiently accessed by threads executing across a group of thread/data lines 408 at a unit stride distance. The result is fast and efficient performance on parallel processing subsystems. Likewise, specific fields across a group of structures are efficiently accessed by threads executing across a group of thread/data lines 408 at a unit stride distance, resulting in fast and efficient performance on parallel processing subsystems. Processing efficiency is improved where memory in an AoSoA 400 is internally stored and accessed as an array of structures of arrays, proportional to the SIMT/SIMD group width (the number of threads or lanes per execution group). Structures in a group are interleaved so fields from adjacent structures are stored sequentially and densely with a unit stride. Software programmers can achieve this efficiency of performance without knowledge of the underlying architecture. Internal storage and access to the array of structures of arrays is opaque to the programmer, allowing the program source code to be executed efficiently on architectures of varying SIMT/SIMD group width. The device driver efficiently accesses memory regardless of the details of the underlying thread/data lane 408 architecture.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A computer-implemented method for accessing data in a data structure stored in a memory, the method comprising:
   receiving a memory access instruction that includes a base address of the data structure that corresponds to a first memory location within the memory;
   computing a first partial offset relative to the base address that is proportional to a position of a target structure of arrays within the data structure;
   computing a second partial offset by adding to the first partial offset a position of a target structure within the target structure of arrays;
   computing a third partial offset by adding to the second partial offset a position of a target field within the target structure; and
   accessing a location within the memory corresponding to the base address plus the third partial offset.

2. The method of claim 1, wherein the memory access instruction further includes a structure size associated with each structure in the target structure of arrays, a structure index, and a field offset, and computing the first partial offset comprises:
   performing an integer division operation that divides the structure index by a number of thread/data lanes associated with a processing core coupled to the memory to produce a first intermediate value;
   multiplying the first intermediate by the structure size to produce a second intermediate value; and
   multiplying the second intermediate value by the number of thread/data lanes to produce the first partial offset.

3. The method of claim 2, wherein computing the second partial offset comprises multiplying a remainder value produced from the integer division operation by a field size associated with each structure within the target structure of arrays.

4. The method of claim 3, wherein computing the third partial offset comprises multiplying the field offset by the number of thread/data lanes.

5. The method of claim 1, wherein the structure size associated with each structure in the target structure of arrays is increased based on a memory access byte granularity associated with the memory.

6. The method of claim 1, wherein the target structure of arrays includes a first number of structures in each row and a second number of structure in each column, and further comprising:
   allocating space in the memory corresponding to a first data field for every structure in a first row of the target structure of arrays; and
   allocating space in the memory corresponding to a second data field for every structure in a second row of the target structure of arrays.

7. The method of claim 6, wherein a second target structure of arrays includes the first number of structures in each row and the second number of structures in each column, and further comprising:
   allocating space in the memory corresponding to the first data field for every structure in a first row of the second target structure of arrays; and
   allocating space in the memory corresponding to the second data field for every structure in a second row of the second target structure of arrays.

8. The method of claim 1, wherein the number of thread/data lanes is a power of two.

9. A computer-readable medium including instructions that, when executed by a processing unit, cause the processing unit to access data in a data structure stored in a memory, by performing the steps of:
   receiving a memory access instruction that includes a base address of the data structure that corresponds to a first memory location within the memory;
   computing a first partial offset relative to the base address that is proportional to a position of a target structure of arrays within the data structure;
   computing a second partial offset by adding to the first partial offset a position of a target structure within the target structure of arrays;
   computing a third partial offset by adding to the second partial offset a position of a target field within the target structure; and
   accessing a location within the memory corresponding to the base address plus the third partial offset.

10. The computer readable medium of claim 9, wherein the memory access instruction further includes a structure size associated with each structure in the target structure of arrays, a structure index, and a field offset, and computing the first partial offset comprises:
    performing an integer division operation that divides the structure index by a number of thread/data lanes associated with a processing core coupled to the memory to produce a first intermediate value;
    multiplying the first intermediate by the structure size to produce a second intermediate value; and
    multiplying the second intermediate value by the number of thread/data lanes to produce the first partial offset.

11. The computer readable medium of claim 10, wherein computing the second partial offset comprises multiplying a remainder value produced from the integer division operation by a field size associated with each structure within the target structure of arrays.

12. The computer readable medium of claim 11, wherein computing the third partial offset comprises multiplying the field offset by the number of thread/data lanes.

13. The computer readable medium of claim 9, wherein the structure size associated with each structure in the target structure of arrays is increased based on a memory access byte granularity associated with the memory.

14. The computer readable medium of claim 9, wherein the target structure of arrays includes a first number of structures in each row and a second number of structure in each column, and further comprising:

allocating space in the memory corresponding to a first data field for every structure in a first row of the target structure of arrays; and allocating space in the memory corresponding to a second data field for every structure in a second row of the target structure of arrays.

15. The computer readable medium of claim 14, wherein a second target structure of arrays includes the first number of structures in each row and the second number of structures in each column, and further comprising:

allocating space in the memory corresponding to the first data field for every structure in a first row of the second target structure of arrays; and allocating space in the memory corresponding to the second data field for every structure in a second row of the second target structure of arrays.

16. The computer readable medium of claim 9, wherein the number of thread/data lanes is a power of two.

17. A computing device comprising:

a processing unit;

a first memory coupled to the processing unit and storing a software driver that is configured to allow data stored in a data structure in a second memory to be accessed by:

receiving a memory access instruction that includes a base address of the data structure that corresponds to a first memory location within the memory;

computing a first partial offset relative to the base address that is proportional to a position of a target structure of arrays within the data structure;

computing a second partial offset by adding to the first partial offset a position of a target structure within the target structure of arrays;

computing a third partial offset by adding to the second partial offset a position of a target field within the target structure; and accessing a location within the memory corresponding to the base address plus the third partial offset.

18. The method of claim 17, wherein the structure size associated with each structure in the target structure of arrays is increased based on a memory access byte granularity associated with the memory.

19. The computing device of claim 17 wherein the target structure of arrays includes a first number of structures in each row and a second number of structure in each column, and further comprising:

allocating space in the memory corresponding to a first data field for every structure in a first row of the target structure of arrays; and allocating space in the memory corresponding to a second data field for every structure in a second row of the target structure of arrays.

20. The computing device of claim 19 wherein a second target structure of arrays includes the first number of structures in each row and the second number of structures in each column, and further comprising:

allocating space in the memory corresponding to the first data field for every structure in a first row of the second target structure of arrays; and allocating space in the memory corresponding to the second data field for every structure in a second row of the second target structure of arrays.

* * * * *

UNITED STATES PATENT AND TRADEMARK OFFICE
CERTIFICATE OF CORRECTION

| | | |
|---|---|---|
| PATENT NO. | : 8,751,771 B2 | Page 1 of 1 |
| APPLICATION NO. | : 13/247855 | |
| DATED | : June 10, 2014 | |
| INVENTOR(S) | : Fahs et al. | |

It is certified that error appears in the above-identified patent and that said Letters Patent is hereby corrected as shown below:

Title Page, Inventors (75):

Please insert --Deceased-- after John R. Nickolls.

Signed and Sealed this
Twenty-third Day of September, 2014

Michelle K. Lee
*Deputy Director of the United States Patent and Trademark Office*